United States Patent
Lynch (10) Patent No.: US 8,302,200 B2
(45) Date of Patent: Oct. 30, 2012

(54) PROTECTED INTRA-SYSTEM INTERCONNECT FOR DIGITAL RIGHTS MANAGEMENT IN ELECTRICAL COMPUTERS AND DIGITAL DATA PROCESSING SYSTEMS

(75) Inventor: Thomas W. Lynch, Galveston, TX (US)

(73) Assignee: TL Digital Systems L.L.C., Wilmington, DE (US)

( * ) Notice: Subject to any disclaimer, the term of this patent is extended or adjusted under 35 U.S.C. 154(b) by 935 days.

(21) Appl. No.: 11/741,493

(22) Filed: Apr. 27, 2007

(65) Prior Publication Data
US 2008/0271152 A1 Oct. 30, 2008

(51) Int. Cl.
*G06F 7/04* (2006.01)
(52) U.S. Cl. ............ 726/26; 726/27; 726/34; 725/25; 725/31; 709/231
(58) Field of Classification Search ............ 726/26–27, 726/34; 725/25, 31; 709/231
See application file for complete search history.

(56) References Cited

U.S. PATENT DOCUMENTS

| | | | |
|---|---|---|---|
| 5,596,718 A | 1/1997 | Boebert et al. | |
| 5,898,705 A | 4/1999 | Graef | |
| 6,246,254 B1 | 6/2001 | Choukalos et al. | |
| 6,681,213 B2 | 1/2004 | Fujimori | |
| 6,732,273 B1 | 5/2004 | Byers | |
| 7,218,567 B1 | 5/2007 | Trimberger et al. | |
| 7,296,296 B2 * | 11/2007 | Dunbar et al. | 726/26 |
| 7,634,447 B2 * | 12/2009 | Kim et al. | 705/51 |
| 2002/0083318 A1 | 6/2002 | Larose | |
| 2002/0099955 A1 * | 7/2002 | Peled et al. | 713/200 |
| 2003/0097644 A1 | 5/2003 | Hong | |
| 2003/0199995 A1 * | 10/2003 | Ishii et al. | 700/9 |
| 2003/0226029 A1 * | 12/2003 | Porter et al. | 713/200 |
| 2003/0236978 A1 * | 12/2003 | Evans et al. | 713/164 |
| 2004/0024931 A1 * | 2/2004 | Lam et al. | 710/8 |
| 2004/0250055 A1 * | 12/2004 | Flanigan | 713/1 |
| 2005/0091488 A1 | 4/2005 | Dunbar et al. | |
| 2005/0160053 A1 * | 7/2005 | Okamoto et al. | 705/67 |
| 2005/0204163 A1 * | 9/2005 | Alkove et al. | 713/201 |
| 2005/0204289 A1 * | 9/2005 | Mohammed et al. | 715/731 |
| 2005/0240985 A1 * | 10/2005 | Alkove et al. | 726/1 |

(Continued)

FOREIGN PATENT DOCUMENTS

WO WO-2006/074527 A1 7/2006

(Continued)

OTHER PUBLICATIONS

"An Efficient CMOS Bridging Fault Simulator: with SPICE Accuracy", *IEEE Transactions on Computer-Aided Design of Integrated Circuits*, vol. 15 No. 9 Sep. 1996, pp. 1071-1080.

*Primary Examiner* — Edan Orgad
*Assistant Examiner* — Canh Le
(74) *Attorney, Agent, or Firm* — Dorsey & Whitney LLP (57) ABSTRACT

Embodiments including protected paths for digital rights management of digital objects are disclosed. Some embodiments disclosed herein may comprise processes or apparatus for transferring data from one or more peripherals to one or more computers or digital data processing systems for the latter to process, store, and/or further transfer and/or for transferring data from the computers or digital data processing systems to the peripherals. Some embodiments disclosed herein may comprise processes or apparatus for interconnecting or communicating between two or more components connected to an interconnection medium a within a single computer or digital data processing system.

21 Claims, 6 Drawing Sheets

U.S. PATENT DOCUMENTS

| | | |
|---|---|---|
| 2006/0123377 A1 | 6/2006 | Schultz et al. |
| 2006/0137028 A1* | 6/2006 | Evans et al. ............... 726/29 |
| 2006/0149918 A1* | 7/2006 | Rudelic et al. ............ 711/202 |
| 2006/0272022 A1 | 11/2006 | Loukianov et al. |
| 2006/0294009 A1* | 12/2006 | Kim et al. ................. 705/50 |
| 2007/0100771 A1 | 5/2007 | Eckleder et al. |
| 2007/0276958 A1 | 11/2007 | Curtis et al. |
| 2008/0168255 A1 | 7/2008 | Abou-Emara et al. |
| 2008/0240230 A1* | 10/2008 | Oxman et al. .......... 375/240.01 |
| 2009/0126027 A1 | 5/2009 | Lynch |
| 2009/0205048 A1 | 8/2009 | Lynch |

FOREIGN PATENT DOCUMENTS

WO    WO 2006/074527 A1 *  7/2006

* cited by examiner

PROTECTED INTRA-SYSTEM INTERCONNECT FOR DIGITAL RIGHTS MANAGEMENT IN ELECTRICAL COMPUTERS AND DIGITAL DATA PROCESSING SYSTEMS

FIELD

The subject matter disclosed herein relates to protected data paths within electrical computers and digital data processing systems for digital rights management. Subject matter disclosed herein may relate to processes or apparatus for transferring data from one or more peripherals to one or more computers or digital data processing systems for the latter to process, store, and/or further transfer and/or for transferring data from the computers or digital data processing systems to the peripherals. Subject matter disclosed herein may relate to processes or apparatus for interconnecting or communicating between two or more components connected to an interconnection medium a within a single computer or digital data processing system.

BACKGROUND

Today, when media content such as an audio compact disk (CD) or Digital Video Disk (DVD) is played on a computing platform, a media player application is executed on a central processing unit (CPU) to listen to and/or view the media content. Because the media content is accessible to application programs, and further because the digital media content can be easily copied and/or otherwise distributed without a loss in quality, copyright holders such as movie studios and record labels are concerned about protecting their copyrighted material.

In order to protect copyrighted material, distributors of copyrighted material often utilize digital rights management (DRM) schemes such as, for example, CSS (content scrambling system), as employed on DVDs, and AACS (advanced access content system), as employed on Blu-Ray disks. Such schemes may employ encryption technologies to prevent access to copyrighted material without a license. However, because the media player is implemented in software, these schemes are prone to being broken by individuals seeking to circumvent the DRM schemes. Once the scheme has been broken, it is possible to widely distribute, perhaps via the Internet, a program that will allow free access (without a license) to the copyrighted material.

SUMMARY

Embodiments described herein include apparatus, systems, and methods. An example apparatus includes a media controller configured to receive a digital object and configured to transmit at least a portion of the digital object over a protected data path to a media output device, wherein the media controller is further configured to receive and transmit control information via a system interconnect.

An example system includes a processor, a media reading device, a media output device, and a media controller. The processor may be coupled to a system interconnect. The media controller may be coupled to the system interconnect and configured to receive a digital object from the media reading device. The media controller may be further configured to transmit at least a portion of the digital object over a protected data path to the media output device. The media controller may be further configured to receive control information from the processor via the system interconnect.

An example method may include receiving a digital object comprising protected and non-protected information. The method may also include transmitting the protected information to a media output device via a protected data path. The method may also include transmitting the non-protected information over a system interconnect. The method may also include preventing the protected information from being transmitted over the system interconnect.

BRIEF DESCRIPTION OF THE DRAWINGS

Subject matter is particularly pointed out and distinctly claimed in the concluding portion of the specification. Claimed subject matter, however, both as to organization and method of operation, together with objects, features, and advantages thereof, may best be understood by reference to the following detailed description if read with the accompanying drawings in which:

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail so as to not obscure claimed subject matter.

Some portions of the detailed description that follows are presented in terms of algorithms, programs and/or symbolic representations of operations on data bits or binary digital signals within a computer memory, for example. These algorithmic descriptions and/or representations may include techniques used in the data processing arts to convey the arrangement of a computer system and/or other information handling system to operate according to such programs, algorithms, and/or symbolic representations of operations.

An algorithm may be generally considered to be a self-consistent sequence of acts and/or operations leading to a desired result. These include physical manipulations of physical quantities. Usually, though not necessarily, these quantities take the form of electrical and/or magnetic signals capable of being stored, transferred, combined, compared, and/or otherwise manipulated. It has proven convenient at times, principally for reasons of common usage, to refer to these signals as bits, values, elements, symbols, characters, terms, numbers and/or the like. It should be understood, however, that all of these and/or similar terms are to be associated with the appropriate physical quantities and are merely convenient labels applied to these quantities.

Unless specifically stated otherwise, as apparent from the following discussion, it is appreciated that throughout this specification a computing platform includes, but it not limited to, a device such as a computer or similar electronic computing device, that manipulates and/or transforms data represented as physical, electronic and/or magnetic quantities and/or other physical quantities within the computing platform's processors, memories, registers, and/or other information storage, transmission, reception and/or display devices. Accordingly, a computing platform refers to a system, a device, and/or logical construct that includes the ability to process and/or store data in the form of signals. Thus, a computing platform, in this context, may comprise hardware, software, firmware and/or any combination thereof. Where it is described that a user instruct a computing platform to perform a certain action it is understood that instruct may mean to direct or cause to perform a task as a result of a selection or action by a user. A user may, for example, instruct a computing platform to embark upon a course of action via an indication of a selection, including, for example, pushing a key, clicking a mouse, maneuvering a pointer, touching a touch screen, and/or be audible sounds. A user may include an end-user. Examples of computing platforms may include, but are not limited by, personal computers, personal digital assistants, cellular phones, laptop computers, notebook computers, televisions, set-top devices, DVD (digital video disc) players, Blu-Ray disc players, etc.

Flowcharts, also referred to as flow diagrams by some, are used in one or more figures herein to illustrate certain aspects of some embodiments. Logic they illustrate is not intended to be exhaustive of any, all, or even most possibilities. Their purpose is to help facilitate an understanding of this disclosure with regard to the particular matters disclosed herein. To this end, many well known techniques and design choices are not repeated herein so as not to obscure the teachings of this disclosure.

Embodiments claimed may include apparatuses for performing the operations herein. This apparatus may be specially constructed for the desired purposes, or it may comprise a general purpose computing device selectively activated and/or reconfigured by a program stored in the device. Such a program may be stored on a storage medium, such as, but is not limited to, any type of disk including floppy disks, optical disks, CD-ROMs, magnetic-optical disks, read-only memories (ROMs), random access memories (RAMs), electrically programmable read-only memories (EPROMs), electrically erasable and/or programmable read only memories (EEPROMs), flash memory, magnetic and/or optical cards, and/or any other type of media suitable for storing electronic instructions, and/or capable of being coupled to a system bus for a computing device and/or other information handling system.

The processes and/or displays presented herein are not inherently related to any particular computing device and/or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments are not described with reference to any particular programming language. It will be appreciated that a variety of programming languages may be used to implement the teachings described herein.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other.

Reference throughout this specification to one embodiment or an embodiment means that a particular feature, structure, or characteristic described in connection with the embodiment is included in at least one embodiment. Thus, the appearances of the phrase in one embodiment or an embodiment in various places throughout this specification are not necessarily all referring to the same embodiment. Furthermore, the particular features, structures, or characteristics may be combined in one or more embodiments.

Instructions as referred to herein relate to expressions which represent one or more logical operations. For example, instructions may be machine-readable by being interpretable by a machine for executing one or more operations on one or more data objects. However, this is merely an example of instructions, and the scope of claimed subject matter is not limited in this respect. In another example, instructions as referred to herein may relate to encoded commands which are executable by a processing circuit having a command set which includes the encoded commands. Such an instruction may be encoded in the form of a machine language understood by the processing circuit. However, these are merely examples of an instruction, and the scope of the claimed subject matter is not limited in this respect.

Storage medium as referred to herein relates to media capable of maintaining expressions which are perceivable by one or more machines. For example, a storage medium may comprise one or more storage devices for storing machine-readable instructions and/or information. Such storage devices may comprise any one of several media types including, for example, magnetic, optical or semiconductor storage media. However, these are merely examples of a storage medium, and the scope of the claimed subject matter is not limited in this respect.

Logic as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA), for example. Also, logic may comprise machine-readable instructions stored in a storage medium in combination with processing circuitry to execute such machine-readable instructions. However, these are merely examples of structures which may provide logic, and the scope of the claimed subject matter is not limited in this respect.

A digital object as referred to herein relates to information that is organized and/or formatted in a digitized form. For example, a digital object may comprise one or more documents, visual media and/or audio media, and/or combinations thereof. Examples of digital objects may include movies and music, as well as electronic books. However, these are merely examples of the types of information that may be maintained in a digital object, and the scope of the claimed subject matter is not limited in this respect. Such a digital object may be maintained in a compressed format to enable efficient storage of the digital object in a storage medium and/or transmission of the digital in a data transmission network. In other embodiments, such a digital object may be encrypted. Digital objects may be distributed via disc or other media, or may be distributed via a network such as the Internet. However, these are merely examples of digital objects, and the scope of the claimed subject matter is not limited in these respects.

As pointed out above, difficulties with state of the art technology, particularly in the area of digital rights management of digital objects, may include susceptibility to the breaking of DRM schemes and to the resulting unlicensed copying of copyrighted media content. A need, therefore, exists for techniques and/or devices and/or systems that may prevent unauthorized access to copyrighted media content.

Figure 1:
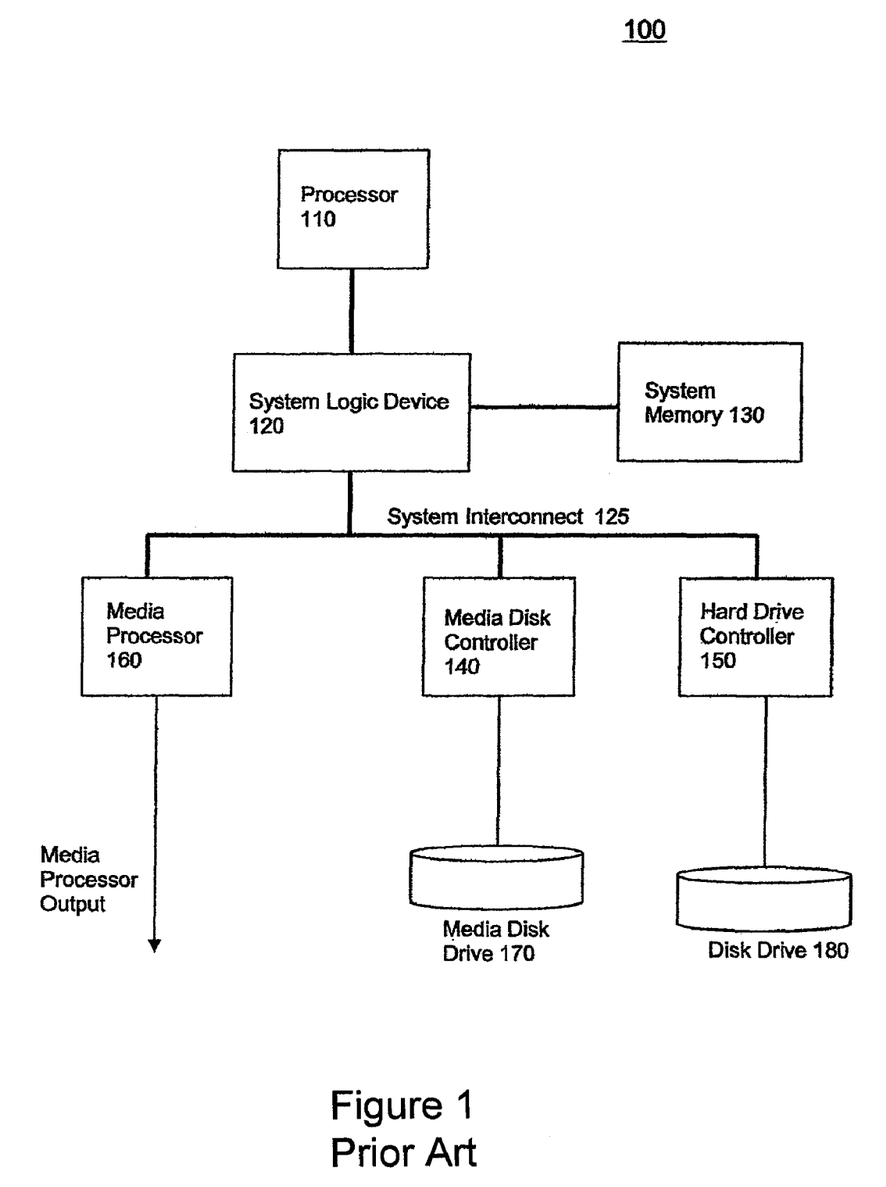
FIG. 1 is a block diagram of an example embodiment of a computing platform.

FIG. 1 is a block diagram of an example conventional computing platform 100. Computing platform 100 for this example comprises a processor 110, a system logic device 120, and a system memory 130. Also included are a hard drive controller 150, a media disk controller 140, and a media processor 160. For this example, media processor 160, media disk controller 140, and hard drive controller 150 are coupled to system logic device 120, and by extension to the rest of the system including processor 110, via a system interconnect 125. System interconnect 125 may comprise a bus such as, for example, a PCI (Peripheral Component Interconnect) Express bus.

Media disk controller 140 for this example is coupled to a media disk drive 170, and hard drive controller 150 is coupled to a disk drive 180. For this example, media disk drive 170 may comprise an optical disk drive, for example a CD drive, and media disk controller 140 may comprise an optical disk controller. Also for this example, media processor 160 may comprise an audio output device. For other examples, media processor 160 may comprise a graphics controller or other type of processor.

To illustrate at least one of the disadvantages inherent in a conventional computing platform, consider the situation if an audio CD is inserted into media disk drive 170. In response to the audio CD being inserted into media disk drive 170, an application may be launched and executed by processor 110 to play the audio media. Audio data files are transferred from media disk controller 140 to one or more elements of the platform 100, including media processor 160. Media processor 160 may provide an analog audio output to one or more speakers or to additional audio processing equipment. In processing the audio data, the audio data is made available to processor 110 as well as to other platform resources via system interconnect 125. Further, it is possible for other software applications to gain access to the audio content. At some point in playing the audio CD, independent of any encoding method used and/or encryption scheme employed and/or independent of any transactions with a third party for permission or payment, etc., there will be a point during the playing process when the audio data must be sent as a series of samples to a digital-analog (D/A) converter. The input to the D/A converter is a decoded form of the music, and thus it may be copied any number of times without loss of quality and without anyone's permission. The same type of issue may be present in the case of video data, for example from a DVD, that must eventually be reduced to decoded pixel values. In general, any media content will be eventually sent to a rendering device, and the input to the rendering device, such as media processor 160 in the current example, may represent decoded media that may be copied without restriction.

Figure 2:
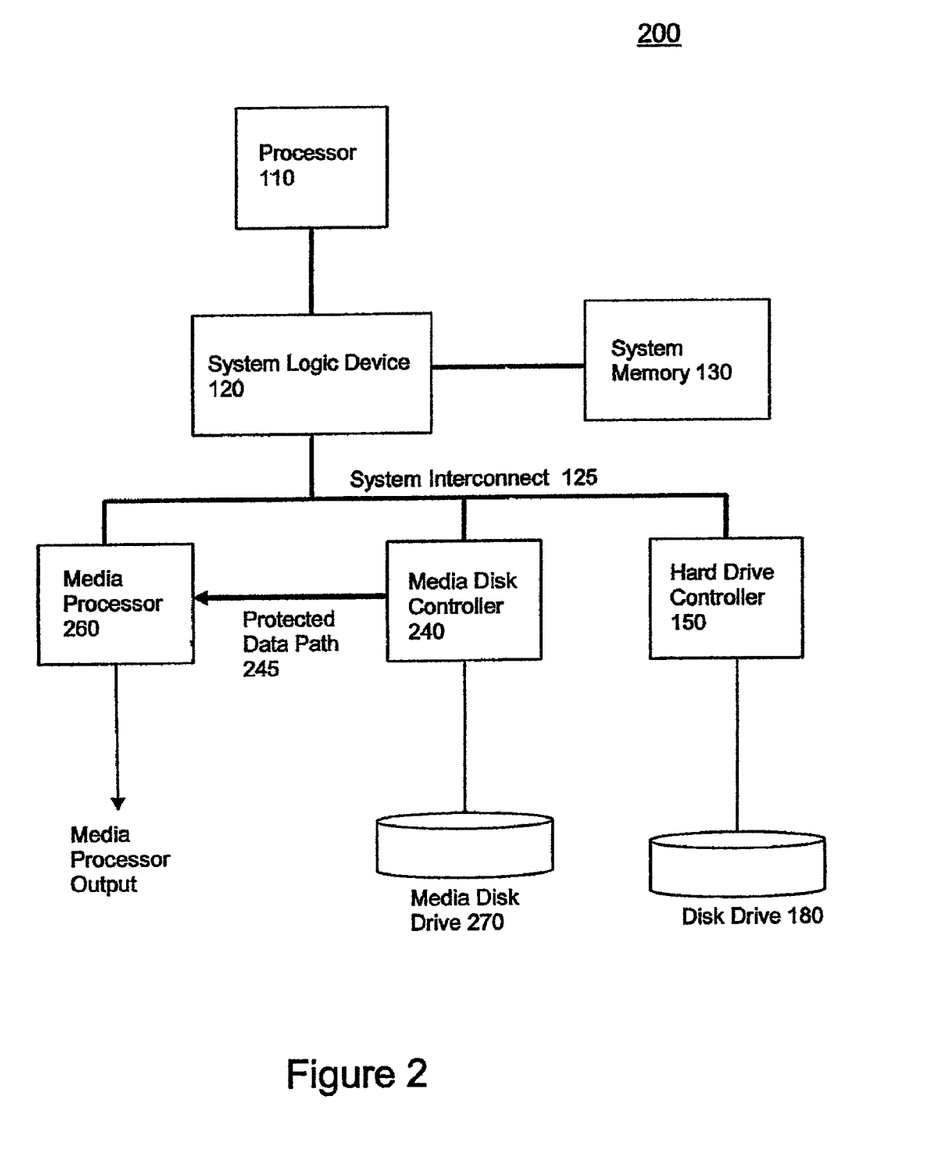
FIG. 2 is a block diagram of an example embodiment of a computing platform comprising an example embodiment of a protected data path.

FIG. 2 is a block diagram of an example embodiment of a computing platform 200 comprising an example embodiment of a protected data path 245 coupling a media disk controller 240 and a media processor 260. Platform 200 also comprises processor 110, system logic device 120, and system memory 130, as well as disk drive 180 and hard drive controller 150. For this example embodiment, media processor 260, media disk controller 240, and hard drive controller 150 are coupled to system logic device 120 via system interconnect 125. Platform 200 also may comprise a media disk drive 270.

For this example embodiment, media disk drive 270 may comprise a CD drive. Also for this example embodiment, the contents of the CD that may be inserted into media disk drive 270 may have a format that conventional CD drives cannot read. This may prevent the CD from being placed into a conventional player and/or computing platform and being copied. For this example embodiment, media disk drive 270 may be adapted to be able to read the contents of the CD. In an alternative embodiment, a special device driver may be utilized to permit reading of the contents of the CD with a conventional disk drive.

For the current example embodiment, if a CD is placed into the media disk drive 270, the media disk drive may be instructed to read the contents of the disk. For this example, the contents of the CD comprise a digital object including audio information. For this example, the audio information is delivered from media disk drive 270 to media disk controller 240. However, instead of passing along the audio information to system interconnect 125, as would be the case with a conventional computing platform, the audio information is delivered to media processor 260 via protected data path 245. For one embodiment, information may be encrypted before transmission across protected data path 245. However, other embodiments may not encrypt information prior to transmission across protected data path 245. Encrypting data on protected data path 245 may have the advantage of preventing anyone from gathering usable information by attaching a logic analyzer or other device to the exposed data path.

Media processor 260 for this example may comprise audio processing circuitry including a D/A converter, and may output an analog audio signal via a media processor output. Also, for this example embodiment, the audio content is not delivered to system interconnect 125, and access requests received over system interconnect 125 at media disk controller 240 and/or media processor 260 are not allowed in order to prevent other system resources, such as, for example, processor 110, from gaining access to the audio information.

For an embodiment, a digital object may include both protected and unprotected information. For example, an audio object may include the actual audio information as protected information and may also include other information, such as, for example, title and/or author information, as non-protected information. Non-protected information for an embodiment may be allowed to be transferred over system interconnect 125. Additional examples of possible non-protected information may include closed captioning information, trailers, and commentary.

Also for this example embodiment, media processor 260 is capable of receiving the protected data stream, and may include circuitry required to process the audio information without help from software running on processor 110. In this manner, the protected information is not able to be accessed from other system resources.

Although the embodiments discussed above describe audio information retrieved from a CD, other embodiments are possible for other media types and/or content, including, but not limited to, audio and/or video information contained on DVD, Blu Ray disks, HD DVD, compact flash media, SD flash, zip disks, etc. Further, although media processor 260 is described above as including audio processing circuitry, other embodiments may include graphics and/or video processing circuitry and/or audio processing circuitry. For example, in one embodiment, media processor 260 may include circuitry capable of decoding and processing DVD video content without assistance from software running on processor 110. Again, in this manner protected information is kept secure from other computing platform resources.

As used herein, the term "protected data path" is meant to denote a data path to a media processor that is not accessible by application programs, operating systems, device drivers, and/or other software agents. The specific examples of protected data paths described herein are merely examples, and the scope of the claimed subject matter is not limited in these respects.

Further, although the example embodiments described above disclose the use of a single protected data path, such as protected data path 245, other embodiments may comprise more than one protected data path. Alternatively, a single protected data path may be shared among various components. For example, a computing platform may comprise both audio processing circuitry and video processing circuitry, and one or more protected data paths may be utilized to transfer protected data from one or more media reading devices and/or controllers to the audio and/or video processing circuitry. Of course, these are merely examples of possible embodiments, and the scope of the claimed subject matter is not limited in these respects.

Figure 3:
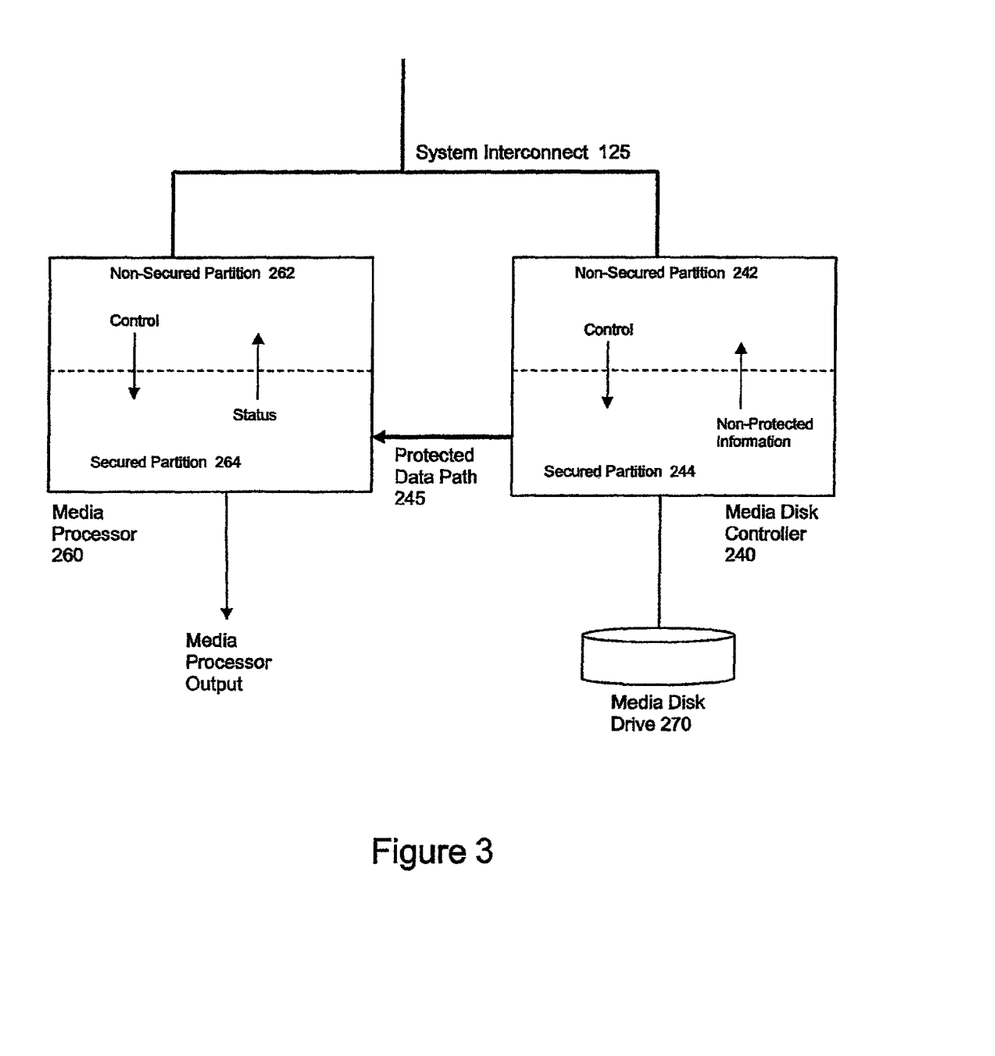
FIG. 3 is a block diagram of example embodiments of a media processor and a media disk controller coupled via an example embodiment of a protected data path.

FIG. 3 is a block diagram of example embodiments of media processor 260 and media disk controller 240 coupled via protected data path 245. For this example, media processor 260 may be logically organized into a non-secured partition 262 and a secured partition 264. Similarly, media disk controller 240 may be logically organized into a non-secured partition 242 and a secured partition 244.

For this embodiment, digital objects may be received from media disk drive 270 at secured partition 244. Non-protected information from the digital object may be transferred to non-secured partition 242, and may also be forwarded to system interconnect 125. Protected information is prevented from crossing from secured partition 244 to non-secured partition 242. Further, for an embodiment control information may be delivered to secured partition 244 from non-secured partition 242. For an embodiment, the control information may comprise commands or other information related to the playing of audio and/or video content. For example, commands to play, stop, pause, fast forward, rewind, etc., may be included in the control information, as well as possibly brightness, contrast, color balance, etc. Of course, these are merely examples of control information that may be delivered to secure partition 244, and the scope of the claimed subject matter is not limited in this respect. Control information of the same and/or different types may be delivered to secured partition 264, although, again, the scope of the claimed subject matter is not limited in this respect. For media processor 260, status information related to the playing of audio and/or video content may be transferred from secured partition 264 to non-secured partition 262. Also, control information may be delivered to secured partition 264 from an operating system window manager to enable proper placement of video data on a computer screen.

Protected data path 245 for this example couples secured partition 244 to secured partition 264. Protected information may be transferred from secured partition 244 to secured partition 264 via protected data path 245. In this manner, for this example embodiment, the protected information is never exposed to system interconnect 125.

Figure 4:
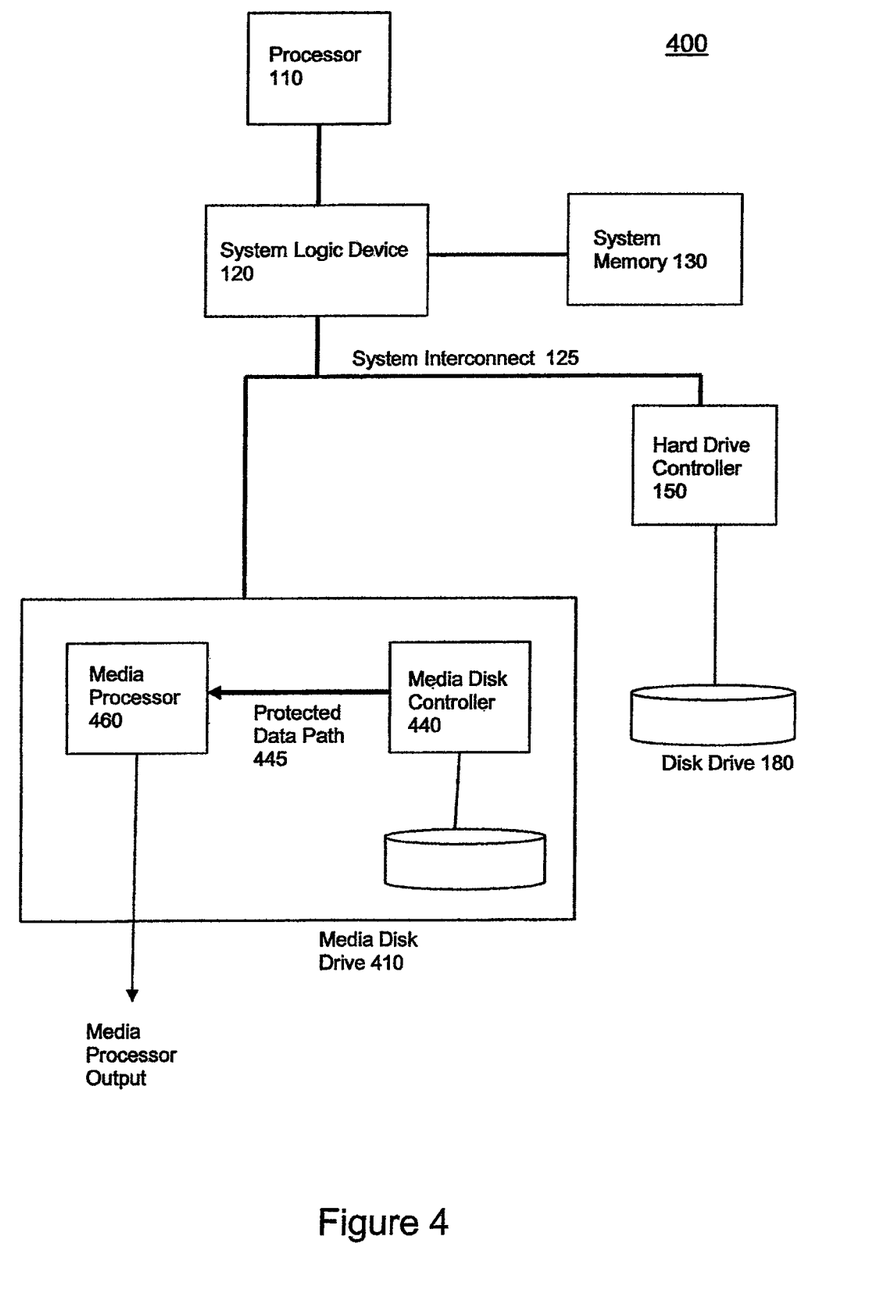
FIG. 4 is a block diagram of an example embodiment of a computing platform comprising an example embodiment of an integrated media processor and media disk controller.

FIG. 4 is a block diagram of an example embodiment of a computing platform 400 comprising an example embodiment of a media processor 460 and a media disk controller 440 integrated into a media disk drive 410. Media processor 460 and media controller 440 may perform similar operations and may include similar features as the media processors and controllers described above. However, in contrast to the embodiments described above, for this example embodiment the audio and/or video processing is performed within media disk drive 410. Media disk drive 410 may comprise an internal protected data path 445 coupling media disk controller 440 and media processor 460.

Media disk drive 410 for an embodiment may comprise all of the circuitry required to process audio and/or video and/or other types of information and to produce a media processor output. For example, in the case of an audio CD, media disk drive 410 may comprise the circuitry required to produce an analog audio signal at the media processor output without requiring help from a program executed by processor 110.

Also, although media disk drive 410 is shown in FIG. 4 as part of computing platform 400, other embodiments are possible where media disk drive 410 is capable of operating as a stand-alone device.

Although the example embodiments described above include separate components for audio and/or video processing and disk read operations, exposed wires and/or pins may be eliminated by performing the audio and/or video disk read operations within the same chip package.

Figure 5:
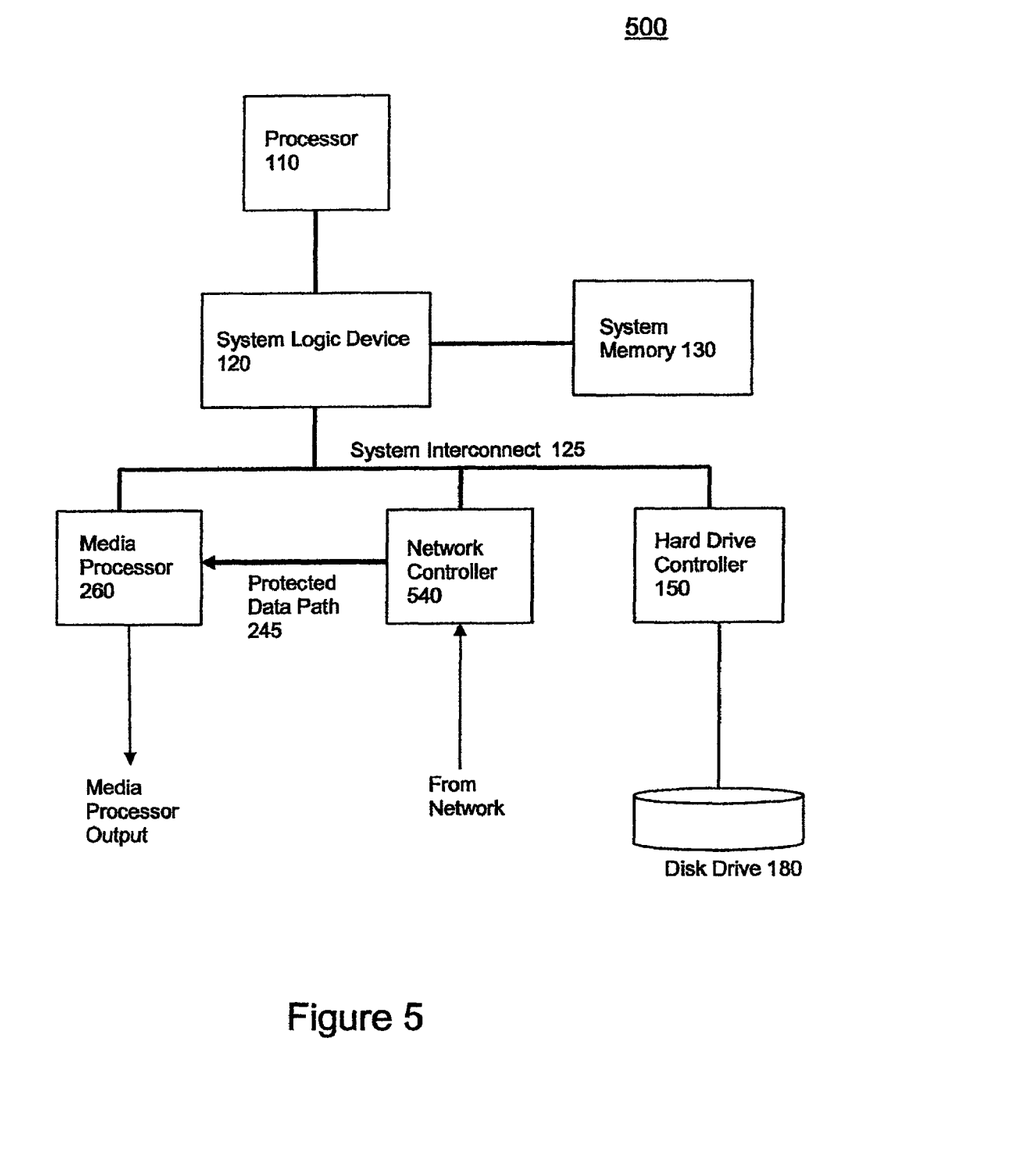
FIG. 5 is a block diagram depicting an example embodiment of a computing platform comprising an example embodiment of a network controller coupled to a media processor via an example embodiment of a protected data path.

FIG. 5 is a block diagram depicting an example embodiment of a computing platform 500 comprising an example embodiment of a network controller 540 coupled to media processor 260 via protected data path 245. Computing platform 500 is similar in many respects to example computing platform 200 described above. However, for this example media content may be received from a network at network controller 540. Network controller may provide connectivity to any of a number of types of networks, including the Internet. Network controller 540 may also provide wireless connectivity to one or more networks for an embodiment.

For this example embodiment, if a digital object including protected information is received from the network, the protected information is transmitted directly to media processor 260 rather than delivering it to other system resources over system interconnect 125. Media processor may render the protected information in order to provide an output, and may perform the rendering without exposing the protected information to other system resources, as described in connection with other embodiments above.

Figure 6:
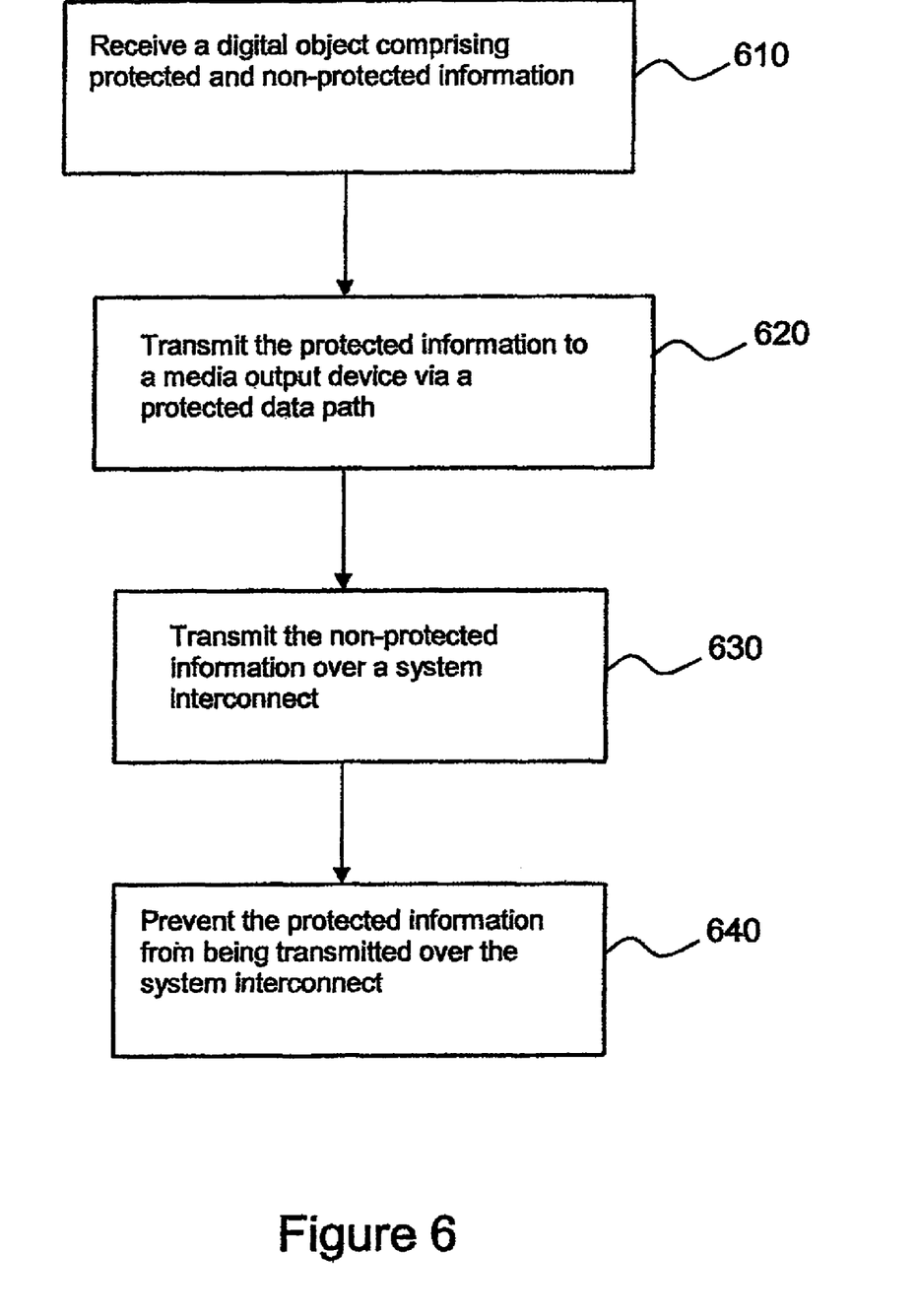
FIG. 6 is a flow diagram of an example embodiment of a method for transmitting protected media content to a media output device via a protected data path.

FIG. 6 is a flow diagram of an example embodiment of a method for transmitting protected media content to a media output device via a protected data path. At block 610, a digital object comprising protected and non-protected information is received. At block 620, the protected information is transmitted to a media output device via a protected data path. Non-protected information is transmitted over a system interconnect at block 630, and at block 640 the protected information is prevented from being transmitted over the system interconnect. The functions described in connection with the example embodiment of FIG. 6 may be implemented in accordance with one or more embodiments described above, although the scope of the claimed subject matter is not limited in this respect. Further, an embodiment in accordance with claimed subject matter may include all, more than all or less than all of blocks 610-640. Furthermore, the order of blocks 610-640 is merely one example order, and the scope of the claimed subject matter is not limited in this respect.

In the preceding description, various aspects of claimed subject matter have been described. For purposes of explanation, systems and configurations were set forth to provide a thorough understanding of claimed subject matter. However, these are merely example illustrations of the above concepts wherein other illustrations may apply as well, and the scope of the claimed subject matter is not limited in these respects. It should be apparent to one skilled in the art having the benefit of this disclosure that claimed subject matter may be practiced without specific details. In other instances, well-known features were omitted and/or simplified so as to not obscure claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of claimed subject matter.

What is claimed is:

1. An apparatus comprising:
    a first processor configured to implement an application and generate control information pertaining to a digital object, wherein the digital object comprises protected information and non-protected information;
    a system interconnect coupled to the first processor and configured to receive the control information;
    a media controller coupled to the system interconnect, wherein the media controller comprises a secured partition and a non-secured partition, wherein the media controller is configured to receive the control information from the system interconnect and, responsive to the control information, receive the digital object at the secured partition, and wherein the media controller is further configured to prevent the protected information from passing from the secured partition to the non-secured partition;
    a protected data path coupled to the media controller, wherein the protected data path is different from the system interconnect and inaccessible to the application while the first processor is operating; and
    a media processor coupled to the protected data path and configured to process at least a portion of the digital object to generate output signals, wherein the media processor is configured to receive, in accordance with the control information, the at least a portion of the digital object from the media controller over the protected data path and wherein the media processor is further configured to provide the output signals to a media output device.

2. The apparatus of claim 1, wherein the media processor is further coupled to the system interconnect, and wherein the media controller is further configured to pass the non-protected information from the secured partition to the non-secured partition, and further wherein the media controller is further configured to transmit the non-protected information from the non-secured partition to the media processor over the system interconnect.

3. The apparatus of claim 1, wherein the media controller comprises an optical media drive controller.

4. The apparatus of claim 1, wherein the media controller comprises a network controller.

5. The apparatus of claim 1, wherein the digital object comprises a music object.

6. The apparatus of claim 1, wherein the digital object comprises a movie object.

7. The apparatus of claim 1, further comprising a media reading device capable of transmitting digital objects to the media controller, and further wherein the media reading device, the media controller, the protected data path, and the media output device are contained within a chassis for the media reading device.

8. The apparatus of claim 7, wherein the media reading device comprises an optical media reading device.

9. A method, comprising:
    executing an application with a first processor, and generating, by the first processor, control information pertaining to a digital object;
    providing the control information from the application to a media controller over a system interconnect;
    receiving the digital object at the media controller, wherein the digital object comprises protected and non-protected information, and wherein the media controller comprises a secured partition and a non-secured partition and wherein said receiving the digital object comprises receiving the digital object at the secured partition;
    passing the non-protected information from the secured partition to the non-secured partition;
    transmitting, in accordance with the received control information, the protected information to a media processor via a protected data path, wherein the protected data path is different from the system interconnect and inaccessible to the application while the first processor is operating;
    transmitting the non-protected information to the media processor over the system interconnect; and
    processing at least the protected information, by the media processor, for transmission to a media output device.

10. The method of claim 9, further comprising preventing the protected information from passing from the secured partition to the non-secured partition.

11. The method of claim 9, wherein the media controller comprises an optical media drive controller.

12. The method of claim 9, wherein the media controller comprises a network controller.

13. The method of claim 9, wherein the digital object comprises a music object.

14. The method of claim 9, wherein the digital object comprises a movie object.

15. The apparatus of claim 1, wherein the at least a portion of the digital object comprises unencrypted data.

16. The method of claim 9, wherein the protected information comprises unencrypted data.

17. The method of claim 9, further comprising:
    preventing the protected information from being transmitted over the system interconnect.

18. The apparatus of claim 1, wherein the media processor comprises a digital-to-analog converter configured to convert the at least a portion of the digital object to analog signals.

19. The apparatus of claim 1, wherein the first processor is configured to implement an operating system, and wherein the protected data path is inaccessible to the operating system.

20. The method of claim 9, wherein the media processor comprises a digital-to-analog converter and wherein said processing at least the protected information comprises converting the protected information into analog signals.

21. The method of claim 9, further comprising implementing an operating system using the first processor, and wherein said protected data path is inaccessible to the operating system.

* * * * *

UNITED STATES PATENT AND TRADEMARK OFFICE
CERTIFICATE OF CORRECTION

PATENT NO. : 8,302,200 B2  
APPLICATION NO. : 11/741493  
DATED : October 30, 2012  
INVENTOR(S) : Lynch Page 1 of 1

It is certified that error appears in the above-identified patent and that said Letters Patent is hereby corrected as shown below:

On the Title Page, in Item (56), under "OTHER PUBLICATIONS", in Column 2, Line 1, delete "WO WO-2006/074527 A1 7/2006".

On the Title Page, in Item (56), under "OTHER PUBLICATIONS", in Column 2, Line 3, delete "vol. 15 No. 9 Sep. 1996 ," and insert -- vol. 15, No. 9, Sep. 1996, --, therefor.

On the Title Page, in Item (57), under "ABSTRACT", in Column 2, Line 11, delete "a within a single" and insert -- within a single --, therefor.

In the Specification

In Column 1, Line 20, delete "a within a single" and insert -- within a single --, therefor.

Signed and Sealed this  
Thirteenth Day of August, 2013

Teresa Stanek Rea  
*Acting Director of the United States Patent and Trademark Office*